United States Patent

Miyaji et al.

[11] 4,035,836
[45] July 12, 1977

[54] PRISM OPTICAL SYSTEM FOR A COLOR TELEVISION CAMERA

[75] Inventors: Yoshimori Miyaji; Hirokazu Fujiki; Tamotsu Nishizawa, all of Tokyo; Naotake Morita, Yokohama, all of Japan

[73] Assignee: Tokyo Shibaura Electric Co., Ltd., Kawasaki, Japan

[21] Appl. No.: 656,078

[22] Filed: Feb. 6, 1976

[30] Foreign Application Priority Data

Feb. 10, 1975 Japan .................. 50-17250

[51] Int. Cl.² .............. H04N 9/04; G02B 5/00; G02B 27/00
[52] U.S. Cl. .................. 358/55; 350/173
[58] Field of Search .............. 358/55; 350/173

[56] References Cited

U.S. PATENT DOCUMENTS 3,610,818  10/1971  Bachmann .............. 340/173 X

Primary Examiner—Robert L. Richardson
Attorney, Agent, or Firm—Oblon, Fisher, Spivak, McClelland & Maier

[57] ABSTRACT

A prism optical system for a color television camera having first and second dichroic layers designed to split a light passing through the objective lens into three color light components adapted to enter the corresponding three pickup tubes, wherein the first dichroic layer is positioned nearer to the objective lens than the second dichroic layer to reflect at least a green light component and defines an angle of 30° or less with a plane perpendicularly intersecting the axis of a nonreflecting light; a light reflected by the first dichroic layer is totally reflected by that prism surface of a first prism which faces the objective lens and is emitted outside of a prism system; the second dichroic layer defines an angle of 45° or less with a plane perpendicularly intersecting the axis of a nonreflecting light; and a light reflected by the second dichroic layer is immediately emitted outside of the prism system.

15 Claims, 4 Drawing Figures

F I G. 2A
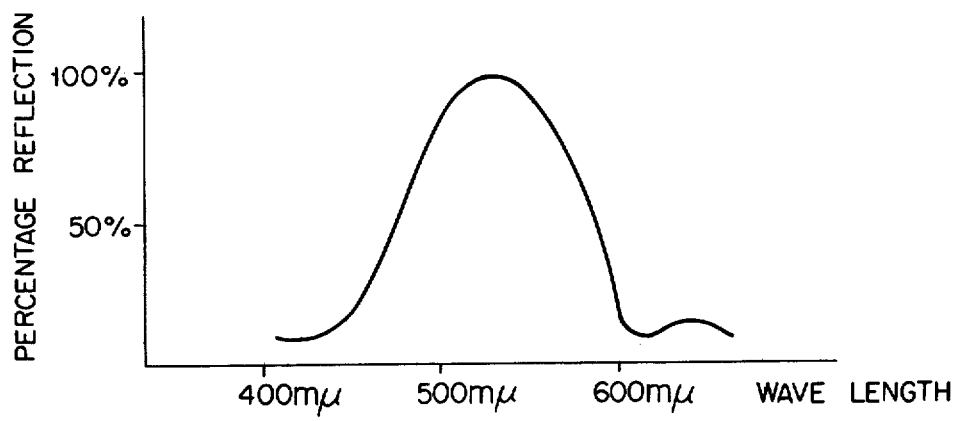
F I G. 2B
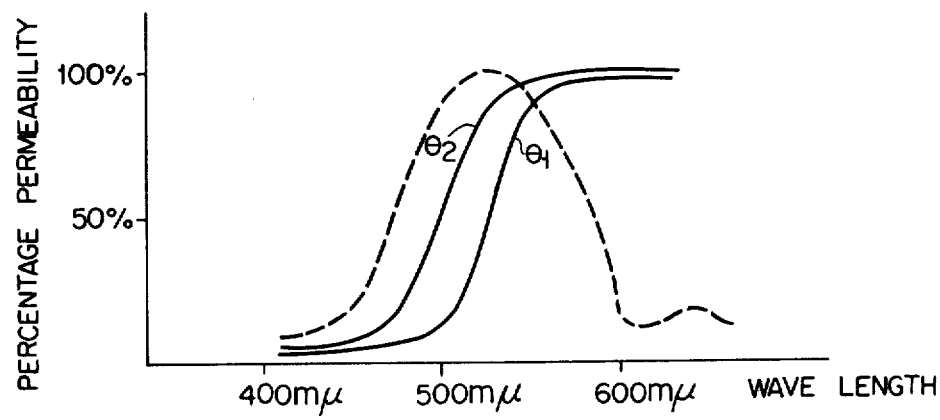

PRISM OPTICAL SYSTEM FOR A COLOR TELEVISION CAMERA

BACKGROUND OF THE INVENTION

This invention relates to a prism optical system for a color television camera and more particularly to improvements on a prism system provided with dichroic layers or colorselective reflecting layers capable of splitting a light into different color light components.

Generally, a color televison camera is provided with an optical system capable of splitting a light reflected from an objective into three primary color light components. The known types of such optical system include that which uses dichroic mirrors or color-separating mirrors and that which is provided with a prism system provided with dichroic layers. Particularly, the prism system using dichroic layers admits of a compact optical construction and is adapted for a handy color television camera.

The U.S. Pat. No. 3,202,039 allowed to Hendrik de Lang et al may be cited as an example of a prism system provided with dichroic layers for a color television camera. This United States patent discloses a prism system in which light beams reflected by the respective dichroic layers are again totally reflected by a flat air-glass transition surface. In the above-mentioned case where light beams reflected by the dichroic layers are again subjected to total reflection, the shape and position of the constituent prisms of the prism system should be determined with care taken to suppress the occurrence of polarization. This requirement tends to render the construction of the prism system considerably complicated. With the aforesaid United States patent, the direction in which three pickup tubes are arranged around the prism system is subject to considerable limitation due to the smaller structural freedom of the prism system. The resultant expanded radial arrangement of the pickup tubes relative to the prism system requires an unnecessarily large space in the color television camera, presenting difficulties in rendering said camera desirably compact.

SUMMARY OF THE INVENTION

It is accordingly an object of this invention to provide a prism optical system of simple construction for a color television camera which can split a light passing through the objective lens into three color light components.

Another object of the invention is to provide a prism optical system for a color television camera, in which polarization of light does not substantially occur in the prism system, namely, which is little subject to the harmful effect of said polarization.

Still another object of the invention is to provide a color television camera which allows pickup tubes to be suitably arranged around the prism system to render said camera prominently compact as a whole.

With the prism optical system of this invention, a first dichroic layer positioned nearer to the objective lens than a second dichroic layer reflects at least a green light component and the second dichloic layer reflects another color light component. The first dichroic layer defines an angle of 30° or less with a plane perpendicularly intersecting the axis of a nonreflecting light passing through a prism system. The light reflected by the first dichroic layer is totally reflected by that prism surface of the first prism which faces the objective lens and is given off outside of the prism system. The second dichroic layer defines an angle of 45° or less with a plane perpendicularly intersecting the axis of a nonreflecting light. A light reflected by the second dichroic layer is not later subjected to total reflection, but is immediately directed outside of the prism system.

According to this invention, the first dichroic layer first separates out a green light component to save it from polarization, enabling the second dichroic layer to be inclined at a relatively large angle. This means that the color light component reflected by the second dichroic layer can be immediately emitted outside of the prism system without being totally reflected by the corresponding prism surface, thereby allowing the prism system to have a simple construction.

The prism optical system of this invention may be formed of three prism units. And two interfaces defined by said three prism units may be provided with first and second dichroic layers respectively.

As mentioned above, the prism system of this invention enables a light component reflected by the second dichroic layer to be immediately sent forth outside of the prism system. Therefore, a pickup tube for receiving said reflected light component can be inclined toward the objective lens, and consequently received in the grip portion of a camera casing.

BRIEF DESCRIPTION OF THE DRAWING

FIGS. 2A and 2B are curve diagrams showing the lightsplitting property of a dichroic layer used with the embodiment of this invention.

DETAILED DESCRIPTION OF THE PREFERRED EMBODIMENTS

Figure 1:
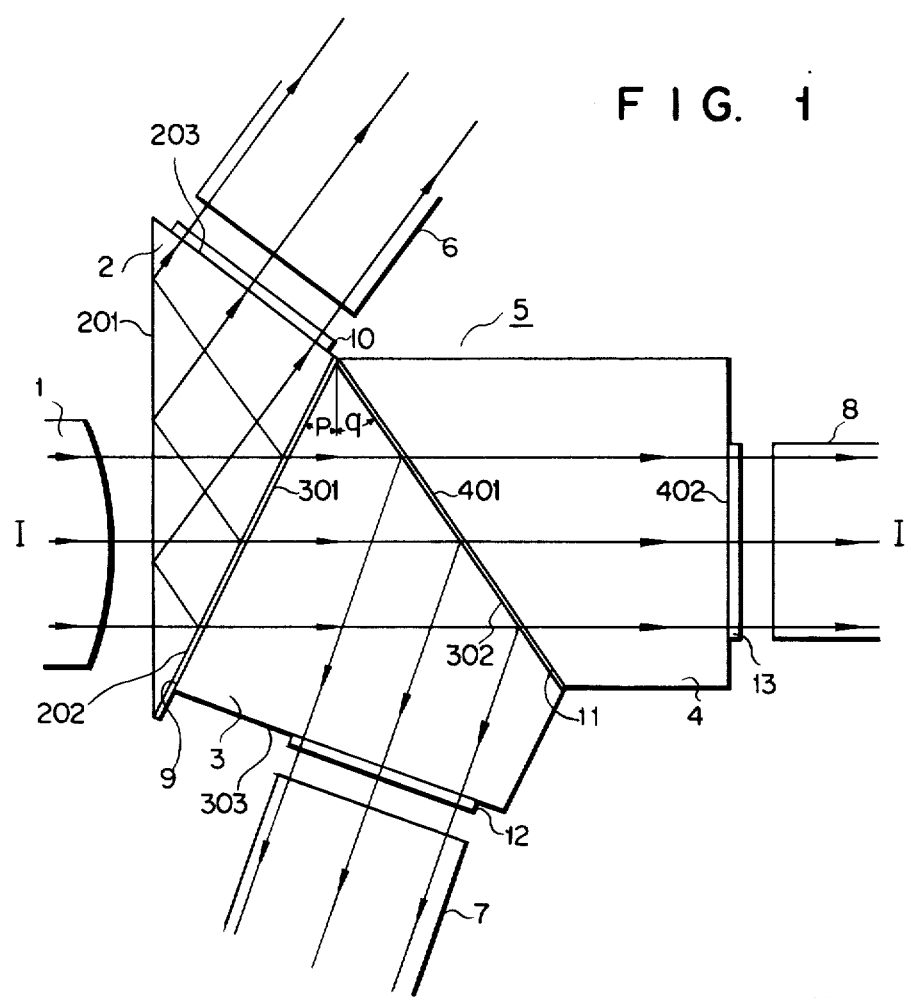
FIG. 1 schematically illustrates a prism optical system embodying this invention for a color television camera.

As illustrated in FIG. 1, a prism system 5 formed of first, second and third prisms 2, 3, 4 each having a generally known refraction index of, for example, 1.51 is set behind the objective lens 1 of a color television camera. The three prisms 2, 3, 4 are provided with the corresponding pickup tubes 6, 7, 8.

That flat prism surface 201 of the first prism 2 included in the prism system 5 which faces the objective lens 1 is positioned preferably perpendicular to the optical axis I—I of the objective lens 1. This arrangement is particularly useful to prevent a light entering the prism surface 201 of the first prism 2 from being refracted and also avoid the complicated setting of the prism surfaces of the other prisms 3, 4 associated with said prism surface 201. This prism surface 201 acts as the later described total reflection surface, or air-glass transition surface.

Another flat prism surface 202 of the first prism 2 is inclined to a plane perpendicular to the optical axis I—I at an angle p as measured clockwise. Said another prism surface 202 is coated with a first dichroic layer 9 which reflects a light component mainly consisting of a green component (hereinafter referred to as a "green light component") of a light entering the prism system 5 through the objective lens 1 and prism surface 201, and allows the passage of the other color light components. This first dichroic layer 9 is a sort of interference filter. The first dichroic layer 9 formed of a laminate of films has its refractive index preset at such a generally known value as permits the passage of the other color light components than the green light component associated with the refractive index of the first prism 2. It is possible to design the first dichroic layer 9 to reflect not only the green light component but also the so-called luminous component consisting of the green light and some portion of the other red and blue light components. In this case, the other portions of the red and blue light components are obviously allowed to pass through the first dichroic layer 9. What calls for particular attention is that the green light component liable to be adversely affected by polarization should be separated first.

FIG. 2A illustrates the property of the first dichroic layer 9 of reflecting particularly a green light component. The ordinate of FIG. 2A indicates the ratio which an amount of reflected light bears to that of an incident light, and the abscissa of FIG. 2A shows the wave lengths of a light entering the prism system 5. As apparent te from FIG. 2A, the first dichroic layer 9 selectively reflects a green light component whose substantially central wave length indicates 527 m$\mu$ (line E).

The inclination angle p of the second prism surface 202 of the first prism 2, namely, that of the first dichroic layer 9 is chosen to be 30° or less. This inclination angle $p$ is significant as a limit up to which the green component of a light entering the first dichroic layer 9 can be selectively reflected thereby and a color component of said light reflected by the first dichroic layer 9 and the other color components passing therethrough can be saved from polarization. Further, the above-mentioned inclination angle $p$ is defined in consideration of the necessity of later causing the light reflected by the first dichroic layer 9 to be totally reflected by the first prism surface 201 of the first prism 2 acting as a total reflection surface, namely, an air-glass transition surface. According to the foregoing embodiment, said inclination angle $p$ is set at 27°. The third prism surface 203 of the first prism 2 should preferably be disposed perpendicular to the traveling direction of the green light component totally reflected by the first prism surface 201 so as to allow said green light component to pass through the first prism 2 without being refracted. The third prism surface 203 is fitted with an auxiliary trimming filter 10 designed to allow the passage of the reflected green light component and cut off unnecessary light portions such as a red or blue light component occupying the spectral region of the green light component. Where, however, the dichroic layer 9 is of the type which reflects the luminous component formed of not only the green light component but also part of the red and blue light components, then the above-mentioned trimming green-filter can be omitted.

A first pickup tube 6 is so disposed as to face the auxiliary green-filter 10. Where the first prism surface 201 is perpendicular to the optical axis I—I, then the pickup tube 6 is so set as to cause its axis to be inclined at a larger angle than 30° (36° in this embodiment) to a plane perpendicular to the optical axis I—I. The first flat prism surface 301 of the second prism 3 is tightly attached to the first dichroic layer 9. Therefore, a light stripped of the green light component which has passed through the dichroic layer 9 enters the second prism 3 substantially without being refracted by the dichroic layer 9. The second prism surface 302 of the second prism 3 on which a light entering the second prism 3 through the first prism surface 301 thereof is projected is inclined to a plane vertical to the optical axis I—I at an angle $q$ as measured couterclockwise. The second prism surface 302 is coated with a second dichroic layer 11, which has a property of reflecting the blue light component from light already stripped of the green light component passing through the first dichroic layer 9 and allowing the passage of the remaining red light component. Or conversely, said second dichroic layer 11 may be so designed as to reflect the red light component from a light stripped of the green light and allow the passage of the remaining blue light component.

The aforesaid inclination angle $q$ of the second prism surface 302 of the second prism 3, namely, the second dichroic layer 11 is chosen to have a relatively large value of 45° or less. This inclination angle is significant as a limit up to which occurrence of the aforesaid polarization can be suppressed and the light entering the second dichroic layer 11 can be split into two other light components than the green light component. What calls for particular attention in this case is that the abovementioned inclination angle $q$ of the second prism surface 302 of the second prism 3 is allowed to have a relatively larger value (35° in this embodiment) than the inclination angle $p$ of the first dichroic layer 9. This point will now be detailed by reference to FIG. 2B, which graphically shows the general property of the second dichroic layer 11 of chiefly drawing out the red light component from an incident light. The ordinate of FIG. 2B indicates the ratio which an amount of a light entering the second dichroic layer 11 bears to that of a light passing therethrough. The abscissa of FIG. 2B shows the wave lengths of a light. The characters $\theta_1$, $\theta_2$ of FIG. 2B denote the inclination angles of the second dichroic layer 11 to a plane perpendicular to the optical axis I—I. The solid lines represent the property of said second dichoric layer 11 when inclined at angles $\theta_1$ and $\theta_2$. The inclination angle $\theta_2$ is taken to be larger than the inclination angle $\theta_1$.

As apparent from FIG. 2B, the spectral region of a light passing through the second dichroic layer 11 varies with the magnitude of the inclination angle. It is seen that the permeability of the green light component whose substantially central wave length indicates 527 m$\mu$ (line E) more prominently varies with the inclination angle of the second dichroic layer 11 than the blue or red light component. For convenience of description, FIG. 2B sets forth the wave length characteristic of the green light component reflected by the first dichroic layer 9 in a broken line. The above-mentioned permeability characteristic of the green light component originates with the fact that the permeability of the green light component is appreciably varied by polarization. This event will be easily understood from the fact that if the green light is made to pass through the second dichroic layer 11, then polarization is liable to take place.

With the optical system of this invention for a color television camera, the light stripped of the green light component which was previously reflected by the first dichroic layer 9 enters the second dichroic layer 11. Accordingly, much attention need not be paid to the occurrence of polarization when the inclination angle of the second dichroic layer 11 is determined. Further from a different point of view, the wave length regions of the red and blue light components adjoining both sides of the wave length region of the green light component are not affected by variations in the inclination angle of the second dichroic layer 11, and consequently the permeability of the red and blue light components through the second dichroic layer 11 and their percentage reflection therefrom do not change with the inclination angle of said second dichroic layer 11.

Where, therefore, the second dichroic layer 11 is inclined at a larger angle than 30°, for example, 35°, the red and blue light components are not subject to polarization. This mean that the inclination angle $q$ of the second dichroic layer 11 may be larger than the inclination angle $p$ of the first dichroic layer 9, namely, can be set at 45° at maximum. Therefore, a light component reflected by the second dichroic layer 11 can be immediately emitted outside of the prism system.

The third prism surface 303 of the second prism 3 has a flat plane perpendicular to the traveling direction of a light component reflected by the second dichroic layer 11, for example, a blue light component so as to enable said blue light component to pass through the prism surface 303 without being refracted. Namely, the light reflected by the second dichroic layer 11 is immediately given off outside of the prism system 5 without being fully reflected by the third prism surface 303. This third prism surface 303 is fitted with a trimming filter 12, for example, a blue filter. This filter 12 is intended to cut off light components having unnecessary wave lengths.

A light component emerging from the prism system 5 through the third prism surface 303 of the second prism 3 and trimming filter 12 is brought into the corresponding pickup tube 7. This pickup tube 7 is clockwise inclined to a plane perpendicular to the optical axis so as to face the objective lens 1.

A third prism 4 is so set as to have its first flat prism surface 401 tightly attached to the second dichroic layer 11. A second prism surface 402 of the third prism 4 substantially perpendicular to the optical axis I—I is fitted with a filter 13. Where a red light component is made to pass through the second dichroic layer 11, said filter 13 consists of the type capable of filtering a red light component.

A light component emerging from the prism system 5 through the second prism surface 402 of the third prism 4 and filter 13 enters the corresponding pickup tube 8. This pickup tube 8 is disposed substantially parallel with the optical axis I—I. The prism system 5 is so designed that the optical paths through which the red, blue and green light components travel from the objective lens 1 to the corresponding pickup tubes 6, 7, 8 are all made equal so as to attain their simultaneous arrival.

The first and second dichroic layers 9, 11 were described to have an arrangement based on the optical axis I—I of the objective lens 1, because said axis and the optical axis of a light passing straight through the prism system 5 (hereinafter referred to as "nonreflecting light") were taken to be in alignment. The optical axis of a nonreflecting light represents the axis of a light passing through the first and second dichroic layers 9, 11. In the foregoing embodiment, the optical axis I—I along which the red light component passes through said both dichroic layers 9, 11 denotes the above-mentioned optical axis of a nonreflecting light.

Where a nonreflecting light axis does not coincide with the optical axis of the objective lens 1, then the first and second dichroic layers 9, 11 should be arranged on the basis of said nonreflecting light axis.

There will now be described by reference to FIG. 3 the case in which the aforesaid prism system 5 is used with a handy color television camera 14.

Figure 3:
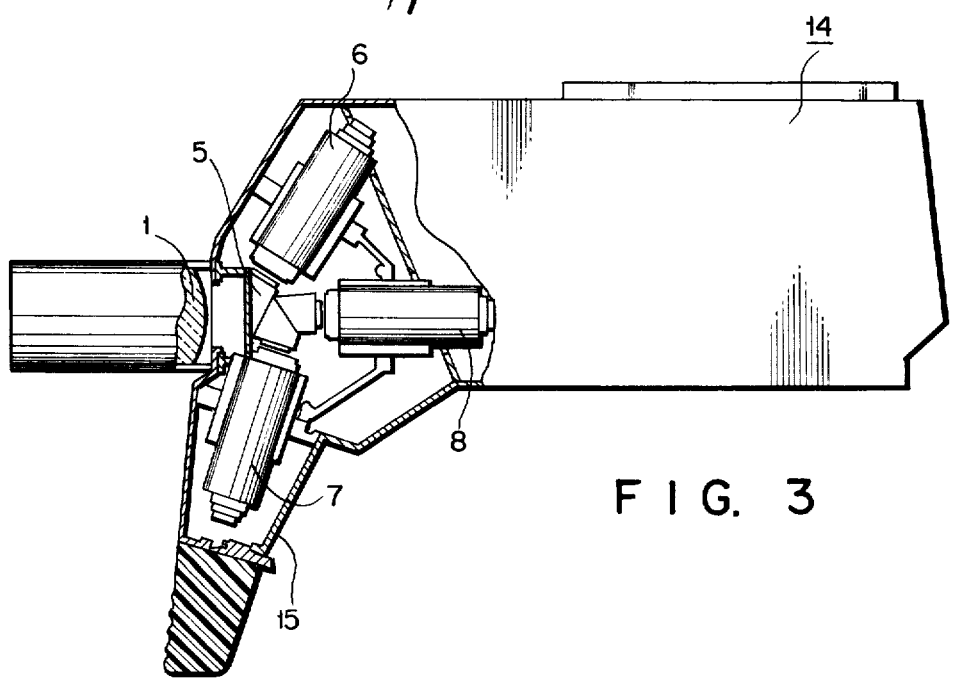
FIG. 3 is a fractional longitudinal sectional view of a handy color television camera provided with a prism optical system embodying this invention.

Among the pickup tubes 6, 7, 8 arranged, as seen from FIGS. 1 and 3, around the prism system 5, the second pickup tube 7 in particular is inclined clockwise to a plane perpendicular to the optical axis of the objective lens 1, so as to face said objective lens 1. This is for the reason that at least part of the second pickup tube 7 is received in that section of a color television camera 14 which is generally provided with a grip 15, eliminating the necessity of allowing a particular space for the second pickup tube 7 in the color television camera 14 and consequently attaining its miniaturization.

The foregoing description of the embodiment of this invention refers to the case where the prism system 5 were formed of three prisms 2, 3, 4. However, the number of prisms is not limited to three, as apparent from the object of this invention.

What we claim is:

1. A prism optical system for a color television camera for splitting a light beam into a plurality of color light components, said system having a non-reflecting optical axis and comprising:
   a. a first prism having a light beam input surface and two light beam output surfaces;
   b. a first dichroic layer mounted on one of the light beam output surfaces of said first prism, said first dichroic layer and said light beam output surface of said first prism forming an angle of less than 30° with a plane perpendicular to the non-reflecting optical axis and reflecting at least a green light component, said light beam input surface of said first prism totally reflecting at least a green light component to give forth the same outside the prism optical system through the other light beam output surface of said first prism;
   c. a second prism having a light beam input surface which is fitted with said first dichroic layer and two light beam output surfaces;
   d. a second dichroic layer mounted on one of the light beam output surfaces of said second prism, said second dichroic layer and said output surface of said second prism forming an angle of less than 45° with a plane perpendicular to the non-reflecting optical axis and reflecting any light components other than the green light component in such a manner that the other light components are given forth outside the prism optical system through the other light beam output surface of said second prism; and
   e. a third prism having a light beam input surface which is fitted with said second dichroic layer and a light beam output surface.

2. The prism optical system accoridng to claim 1, wherein the first dichroic layer reflects according luminous component formed of not only a green light component but also part of red and blue light components.

3. The prism optical system according to claim 1, wherein the second dichroic layer reflects a blue light component and allows the passage of a red component.

4. The prism optical system according to claim 1, wherein the second dichroic layer reflects a red light component and allows the passage of a blue light component.

5. The prism optical system according to claim 1, wherein said first and second prisms have each its other light beam output surface fitted with a trimming filter, and said third prism has its light beam output surface fitted with a trimming filter.

6. In a color television camera having an objective lens, and first, second and third pickup tubes, a prism optical system disposed between the objective lens and said first, second and third pickup tubes to split a light passing through the objective lens into a plurality of color light components corresponding to said first, second and third pickup tubes, said prism optical system having a non-reflecting optical axis and comprising:

a. a first prism having a light beam input surface which faces the objective lens and two light beam output surfaces one of which faces the first pickup tube;
   b. a first dichroic layer mounted on the other light beam output surface of said first prism, said first dichroic layer and said other light beam output surface of said first prism forming an angle of less than 30° with a plane perpendicular to the non-reflecting optical axis and reflecting at least a green light component, the light beam input surface of said first prism totally reflecting at least a green light component to give forth the same outside the prism optical system through the one of the light beam output surfaces of said first prism;
   c. a second prism having a light beam input surface which is fitted with said first dichroic layer and two light beam output surfaces one of which faces the second pickup tube;
   d. a second dichroic layer mounted on the other light beam output surface of said second prism, said second dichroic layer and said other output surface of said second prism forming an angle of less than 45° with a plane perpendicular to the non-reflecting optical axis and reflecting any light components other than the green light component in such a manner that the other light component are given forth outside the prism optical system through the one of the light beam output surfaces of said second prism and to project the same into the second pick tube; and
   e. a third prism having a light beam input surface which is fitted with said second dichroic layer and a light beam output surface which faces the third pickup tube.

7. The color television camera according to claim 6, wherein the first dichloric layer reflects a luminous light component formed of not only the green light component but also part of the red and blue light component.

8. The color television camera according to claim 6, wherein said first and second prisms have each its other light beam output surface fitted with a trimming filter, and said third prism has its light beam output surface fitted with a trimming filter.

9. The color television camera according to claim 6, wherein the second dichroic layer reflects a red light component and allows the passage of a blue light component.

10. In a color television camera, having an objective lens, and first, second and third pickup tubes, a prism optical system disposed between the objective lens and said first, second and third pickup tubes to split a light passing through the objective lens into a plurality of color light components corresponding to said first, second and third pickup tubes, and a grip-bearing case for holding the objective lens, the pickup tubes and the prism optical system and having a grip section in which a part of the second pickup tube is held, said prism optical system having a non-reflecting optical axis and comprising:

a. a first prism having a light beam input surface which faces the objective lens and two light beam output surfaces one of which faces the first pickup tube;
   b. a first dichroic layer mounted on the other light beam output surface of said first prism, said first dichroic layer and said other light beam output surface of said first prism forming an angle of less than 30° with a plane perpendicular to the non-reflecting optical axis and reflecting at least a green light component, the light beam input surface of said first prism totally reflecting at least a green light component to give forth the same outside the prism optical system through the one of the light beam output surfaces of said first prism;
   c. a second prism having a light beam input surface which is fitted with said first dichroic layer and two light beam output surfaces one of which faces the second pickup tube;
   d. a second dichroic layer mounted on the other light beam output surface of said second prism, said second dichroic layer and said other output surface of said second prism forming an angle of less than 45° with a plane perpendicular to the non-reflecting optical axis and reflecting any light components other than the green light component in such a manner that the other light components are given forth outside the prism optical system through the one of the light beam output surfaces of said second prism and to project the same into the second pick tube; and
   e. a third prism having a light beam input surface which is fitted with said second dichroic layer and a light beam output surface which faces the third pickup tube.

11. The color television camera according to claim 10, wherein the dichroic layer reflects a luminous light component formed of not only a green light component but also part of red and blue light components.

12. The color television camera according to claim 10, wherein the second dichroic layer reflects a blue light component and allows the passage of a red light component.

13. The color television camera according to claim 10, wherein siad first and second prisms have each its other light beam output surface fitted with a trimming filter, and said third prism has its light beam output surface fitted with a trimming filter.

14. The color television camera according to claim 10, wherein the second dichroic layer reflects a red light component and allows the passage of a blue light component.

15. The color television camera according to claim 6, wherein the second dichroic layer reflects a blue light component and allows the passage of a red light component.

* * * * *